April 17, 1951      P. C. JONES      2,548,888
RADIO RANGE TRAINING DEVICE
Filed July 24, 1946
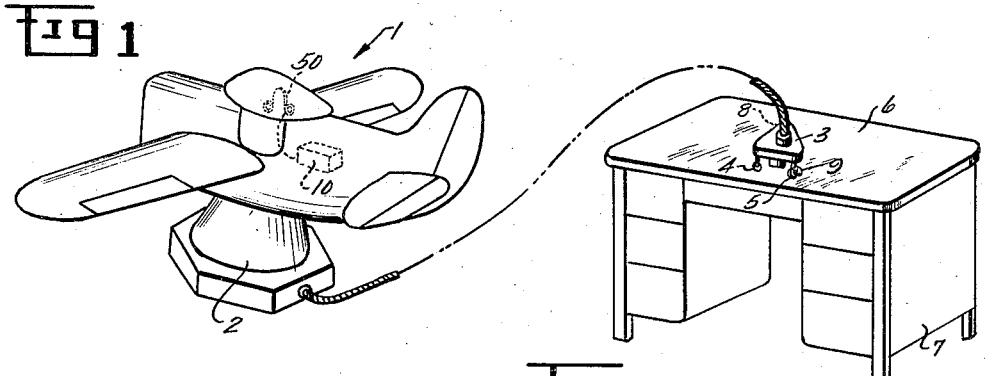
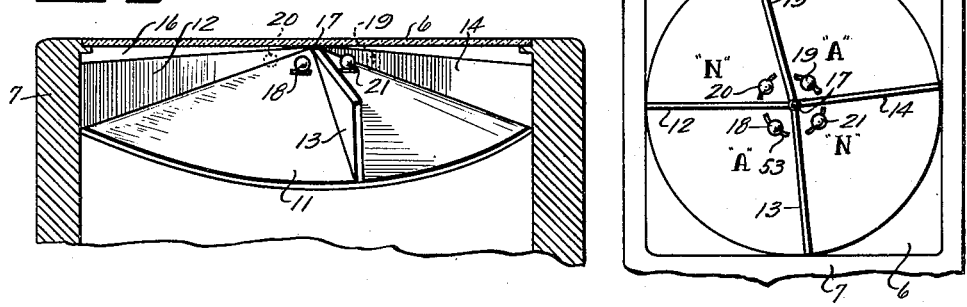
INVENTOR.
PETER C. JONES Patented Apr. 17, 1951

2,548,888

UNITED STATES PATENT OFFICE 2,548,888

RADIO RANGE TRAINING DEVICE

Peter C. Jones, Dayton, Ohio

Application July 24, 1946, Serial No. 685,882

7 Claims. (Cl. 35—10.2)

(Granted under the act of March 3, 1883, as amended April 30, 1928; 370 O. G. 757)

The invention described herein may be manufactured and used by or for the Government for governmental purposes without payment to me of any royalty thereon.

This invention relates to a radio range simulating device for use with aviation ground trainers such as, for example, the Link trainer. It is an object of the invention to provide a radio range simulating device that is less expensive to construct than prior devices of this type, and which produces a more realistic signal and one which is free from key clicks. The present system also permits the use of standard radio range charts and is readily adaptable to cross country range problems.

In accordance with the present invention, a radio range field is simulated by means of a field of light produced on a translucent table, the light field being divided into sectors corresponding to the A and N sectors of a conventional radio range. The light in the various sectors is keyed in accordance with the code letter A or the code letter N in the same manner in which the radiation from a radio range is keyed. The recorder of the trainer has attached to it a photoelectric cell which in passing over the light area transmits "A," "N" or "on course" signals to the trainer, depending upon the position of the recorder.

In the drawings:

Fig. 1 shows the overall arrangement of the training device;

Fig. 2 is an elevational view of the reflector and associated apparatus for producing the light signalling field;

Fig. 3 is a plan view of the apparatus shown in Fig. 2;

Fig. 4 shows a signal generating circuit for converting photoelectric signals into audible signals; and Fig. 5 shows the keying arrangement for the light sources used in the system.

Referring to Fig. 1, I is a conventional trainer cabinet rotatably and tiltably mounted on pedestal 2, and 7 is a table having a top consisting of a plate 6 made of translucent material. The recorder 3 rests on three wheels of which wheels 4 and 8 (not shown) are driving wheels and wheel 5 is a marker wheel. The photoelectric cell 9 is mounted on the recorder so as to be as close as possible to the surface of the plate 6 and to the recorder wheel. A control cable connects the trainer cabinet to the recorder and provides the necessary interconnecting circuits to permit the recorder to be moved over the surface of the table by means of controls in the trainer. The signal from the photoelectric cell is also transmitted through this cable to a signal generator 10 which converts it into an audible signal heard in headphones 50.

Referring to Fig. 2, a conical reflector 11 is mounted under the translucent plate 6 so that the apex of the reflector touches the bottom surface of the plate. Barriers 12, 13, 14 and 15 shown in Figs. 2 and 3, each corresponding to a radio range course, are pivoted at the apex 17 and their lower edges are in contact with the surface of the reflector. There is a light leakage gap 16 between the upper edge of the barriers and the lower surface of the plate, the size of which is proportional to the distance from the apex, being zero at the apex. Light sources 18, 19, 20 and 21 are located between the barriers near the apex as shown in Figs. 2 and 3. Slots, such as 53, are provided for each of the lights to permit adjustment to a point midway between the barriers. These lights are connected in a keying circuit shown in Fig. 5. The cam 51 and double throw switch 52 cause lights 20 and 21 to be keyed in accordance with the code letter N (_ .) and the lights 18 and 19 to be keyed in accordance with the code letter A (. _). As in a conventional range, this keying is interlocked so that one pair or the other pair of lights is always lit.

Fig. 4 shows the circuit diagram of signal generator 10 in Fig. 1. A photoelectric tube 9 is coupled to the control grid of pentode tube 25 across resistor 22. Tube 25 is normally biased to cut off by the potential drop across resistor 26. A 1020 kc. audio oscillator employing tube 35 is provided and the output of this oscillator is coupled to the suppressor grid of tube 25 through condenser 31. The output of tube 25 is coupled through the condenser 38, lead 39 and volume control 40—41 to the control grid of amplifier tube 45, the output of which is coupled to headphones 50. When light falls on the photo tube 9, current through resistor 22 raises the potential of the control grid of tube 25 above the cut-off point. Audio signals applied to the suppressor grid of this tube then appear in its output circuit and are amplified by tube 45 and applied to the headphones 50. The volume of the signal will be dependent upon the potential on the control grid of tube 25 which is controlled by the light intensity on photo tube 9. The general level of the signal may be adjusted by means of the volume control 40—41.

The operation of the system is as follows: If the recorder is in an A sector, for example, the light falling on the photoelectric cell will be keyed with the letter A, which will be heard in the headphones 50. When the recorder comes in the vicinity of one of the barriers, it will receive light from the A sector and also some light from the N sector due to the leakage gap shown in Fig. 2. The signal heard will therefore be an A signal with the weaker N signal appearing in the background, thus simulating the twilight zone of a conventional radio range course. When the photo cell of the recorder is directly over a barrier, the light from the A sector and the light from the N sector will fall on the cell with equal intensity, thus producing in the headphones A and N signals of equal intensity which will be heard as a continuous tone since the keying of the two signals is interlocked as explained in connection with Fig. 5. The purpose of having the light leakage gap increase in size as the distance from the apex increases is to have the amount of overlap from adjacent sectors increase as the distance from the apex increases, thus simulating the divergence of an actual radio range course.

Cross country radio range navigational problems can be easily set up in this system by providing a plurality of simulated radio range fields of the type described on the translucent table top. In this way, the student can pass through a series of radio range fields in a manner similar to cross country flying using radio ranges for navigation.

What I claim is:

1. A training device for simulating a radio range comprising a plate of translucent material, a reflector located adjacent to the bottom surface of said plate, four light barriers positioned between said reflector and said plate and extending radially from a point on said reflector, a source of light in each reflector area and means for keying the light sources in one pair of oppositely disposed reflector areas with the code letter N and the light sources in the other pair of oppositely disposed reflector areas with the code letter A, whereby four sectoral areas of light are produced on the top surface of said plate, said sectoral areas of light being adjacent to each other and extending completely around a common center so as to correspond to the horizontal sectoral areas between courses of a four course radio range, a recording device movable over the top surface of said translucent plate, a photoelectric element mounted on said device in proximity to the upper surface of said plate so as to receive light from the said upper surface, means for generating an audible tone, and means for utilizing the electrical output of said photoelectric element to control the intensity of said tone in accordance with the variations in intensity of the light received by said photoelectric element.

2. Apparatus as claimed in claim 1 in which means are provided for extending each of said sectoral areas of light with diminishing intensity a short distance into the sectoral areas adjacent thereto.

3. Apparatus as claimed in claim 1 in which the barriers are adjustable about the said point.

4. A training device for simulating a radio range comprising a plate of translucent material, a conical reflector having its apex adjacent to the bottom surface of said plate and its axis perpendicular to said plate, four adjustable light barriers pivoted at said apex and extending radially therefrom, said barriers making contact with the surface of said reflector and extending toward but stopping short of said plate thereby forming a light leakage gap, and a light source located near the apex in each of the four angles formed by the four barriers so that two pairs of light sources are provided, the light sources of each pair being oppositely disposed with respect to the apex, and means for keying one of the pairs of light sources in accordance with the code letter N and the other pair in accordance with the code letter A, whereby four sectoral areas of light are produced on the top surface of said plate, said sectoral areas of light being adjacent to each other and extending completely around a common center so that they correspond to the horizontal sectoral areas between courses of a four course radio range, a recording device movable over the top surface of said translucent plate, a photoelectric element mounted on said device in proximity to the upper surface of said plate so as to receive light from the said upper surface, means for generating an audible tone, and means for utilizing the electrical output of said photoelectric element to control the intensity of said tone in accordance with the variations in intensity of the light received by said photoelectric element.

5. Apparatus as claimed in claim 4 in which the size of said leakage gap at any point is proportional to the distance of the point from the apex.

6. The ground training device for radio range problems comprising a conventional ground trainer cabinet, a plate of translucent material, a light sensitive recorder adapted to be moved over the surface of said plate by means of controls in said cabinet, indicating means in said cabinet adapted to convert signals from said light sensitive recorder into audible signals, radio range field simulating means comprising a conical reflector having its apex adjacent to one surface of said plate and its axis perpendicular to said plate, four adjustable light barriers pivoted at said apex and extending radially therefrom, said barriers making contact with the surface of said reflector and extending toward but stopping short of said plate thereby forming a light leakage gap, a light source located near the apex in each of the four angles formed by the four barriers so that two pairs of light sources are provided, the light sources of each pair being oppositely disposed with respect to the apex, and means for keying one of the pairs of light sources in accordance with code letter N and the other pair in accordance with code letter A.

7. Apparatus as claimed in claim 6 in which means are provided for adjusting the lights to points midway between the barriers.

PETER C. JONES.

REFERENCES CITED

The following references are of record in the file of this patent:

UNITED STATES PATENTS

| Number | Name | Date |
| --- | --- | --- |
| 2,070,178 | Pottenger | Feb. 9, 1937 |
| 2,243,600 | Hulst | May 27, 1941 |
| 2,326,764 | Crane | Aug. 17, 1943 |
| 2,346,693 | Lyman | Apr. 18, 1944 |
| 2,352,216 | Melvin | June 27, 1944 |
| 2,358,793 | Crane | Sept. 26, 1944 |
| 2,389,359 | Grow | Nov. 20, 1945 |
| 2,429,597 | Andrews | Oct. 28, 1947 |
| 2,454,503 | Crane | Nov. 23, 1948 |
| 2,494,566 | Linderman | Jan. 17, 1950 |